(No Model.) 7 Sheets—Sheet 1.

J. F. WITTEMANN.
MACHINE FOR MAKING CARBONATED BEVERAGES.

No. 457,978. Patented Aug. 18, 1891.

WITNESSES:
A. Schehl.
Carl Keip

INVENTOR
Jacob F. Wittemann
BY
Goepel & Raegener
ATTORNEYS.

(No Model.) 7 Sheets—Sheet 4.

J. F. WITTEMANN.
MACHINE FOR MAKING CARBONATED BEVERAGES.

No. 457,978. Patented Aug. 18, 1891.

WITNESSES:
A. Schehl.
Carl Karp

INVENTOR
Jacob F. Wittemann
BY
Goepel & Raegener
ATTORNEYS.

(No Model.) 7 Sheets—Sheet 5.
J. F. WITTEMANN.
MACHINE FOR MAKING CARBONATED BEVERAGES.
No. 457,978. Patented Aug. 18, 1891.
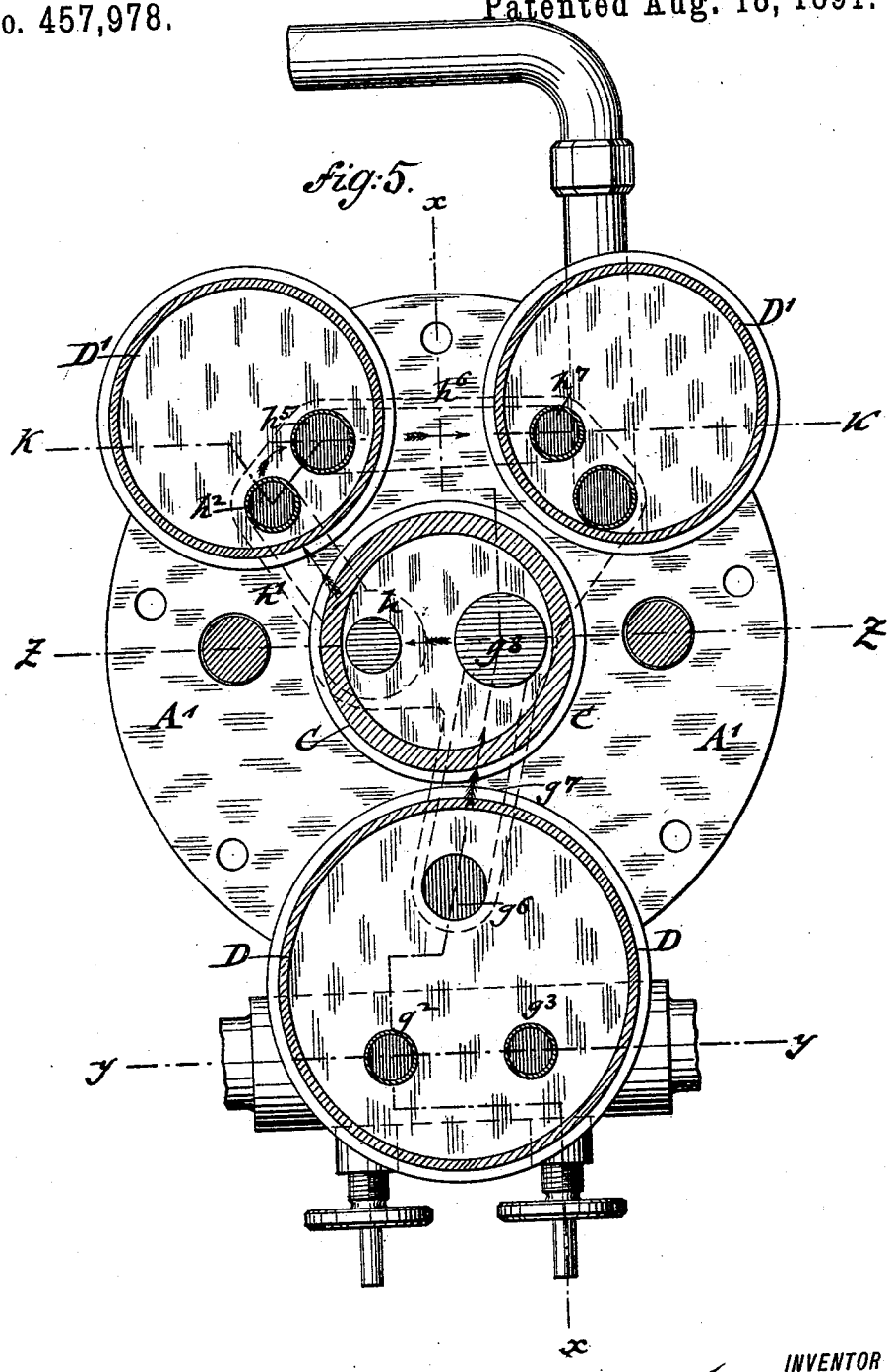

(No Model.)  7 Sheets—Sheet 6.
J. F. WITTEMANN.
MACHINE FOR MAKING CARBONATED BEVERAGES.
No. 457,978.  Patented Aug. 18, 1891.
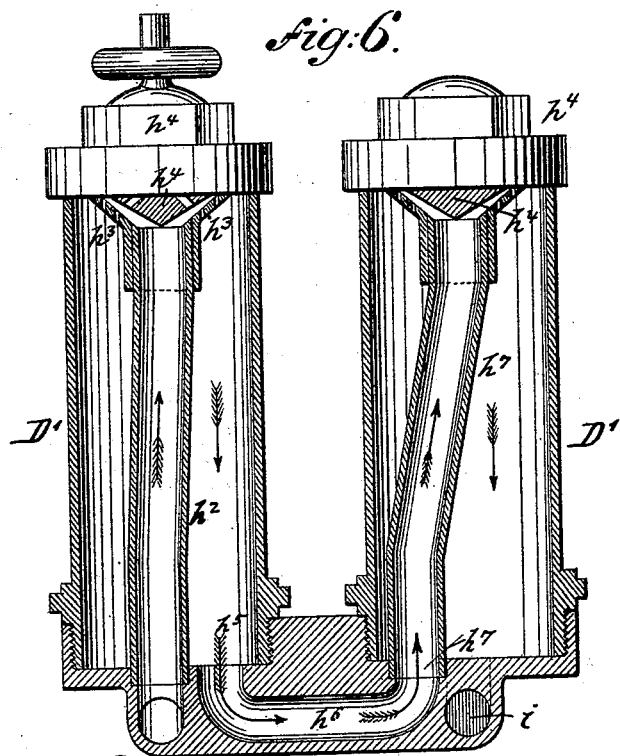
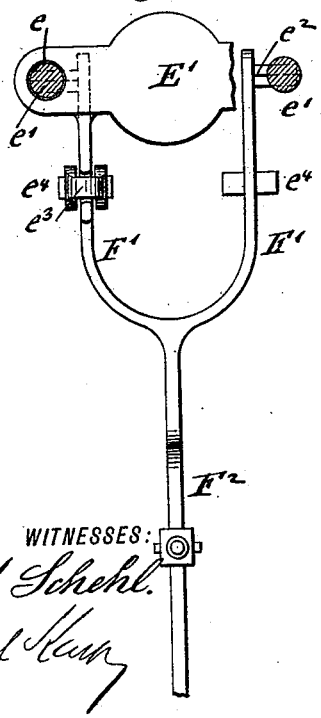
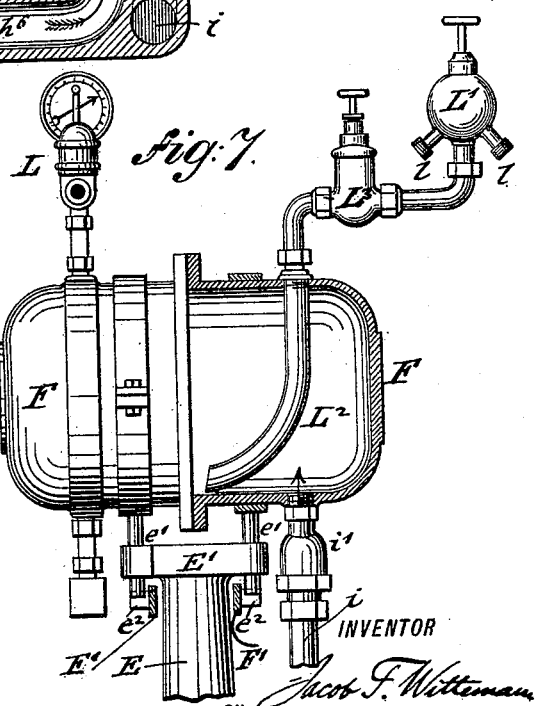
WITNESSES:  INVENTOR
A. Schehl.  Jacob F. Wittemann
Carl Heun  BY
  Goepel & Raegener
  ATTORNEYS.

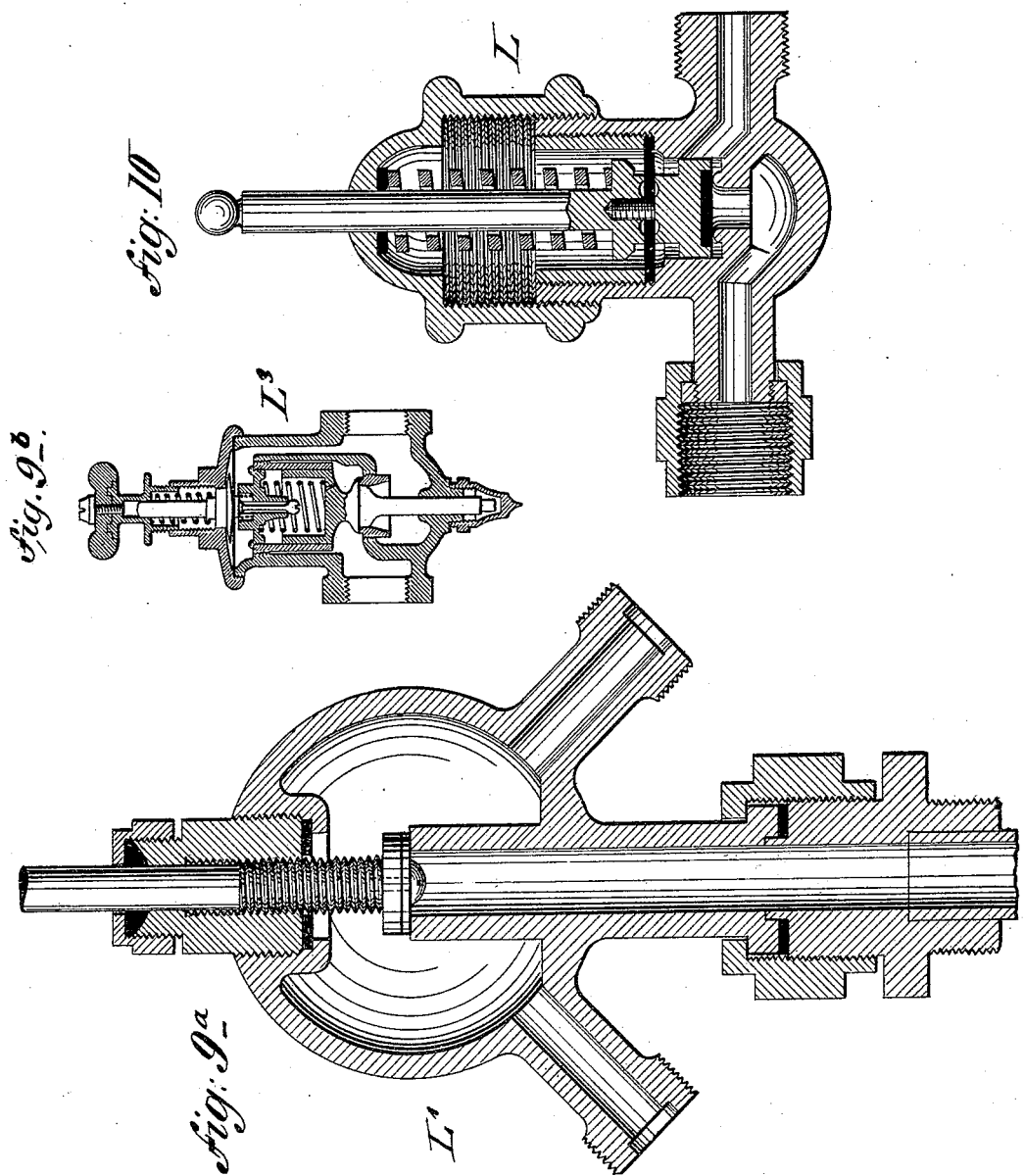

UNITED STATES PATENT OFFICE.

JACOB F. WITTEMANN, OF NEW YORK, N. Y.

MACHINE FOR MAKING CARBONATED BEVERAGES.

SPECIFICATION forming part of Letters Patent No. 457,978, dated August 18, 1891.

Application filed January 8, 1889. Serial No. 295,750. (No model.)

*To all whom it may concern:*

Be it known that I, JACOB F. WITTEMANN, a citizen of the United States, and a resident of the city, county, and State of New York, have invented certain new and useful Improvements in Machines for Making Carbonated Beverages, of which the following is a specification.

The object of this invention is to furnish to manufacturers of carbonated beverages an improved apparatus by which the water or other liquid and the carbonic acid are taken from separate holders or reservoirs and united in a very effective manner without the use of movable mixers or agitators and finally discharged into a receiver from which the carbonated liquid is distributed; and the invention consists, in its general features, of an apparatus for making carbonated beverages, in which the water or other liquid and the carbonic acid are drawn by means of a pump, first, through a primary mixing-vessel and then forced through a number of impregnating-vessels which are provided with spraying devices of novel construction, by which the intimate mixing or impregnating of the liquid with the carbonic acid is produced.

The invention consists, further, of certain details of construction and combination of parts by which the objects of the invention are carried out, and which will be fully described hereinafter, and finally pointed out in the claims.

Figure 1:
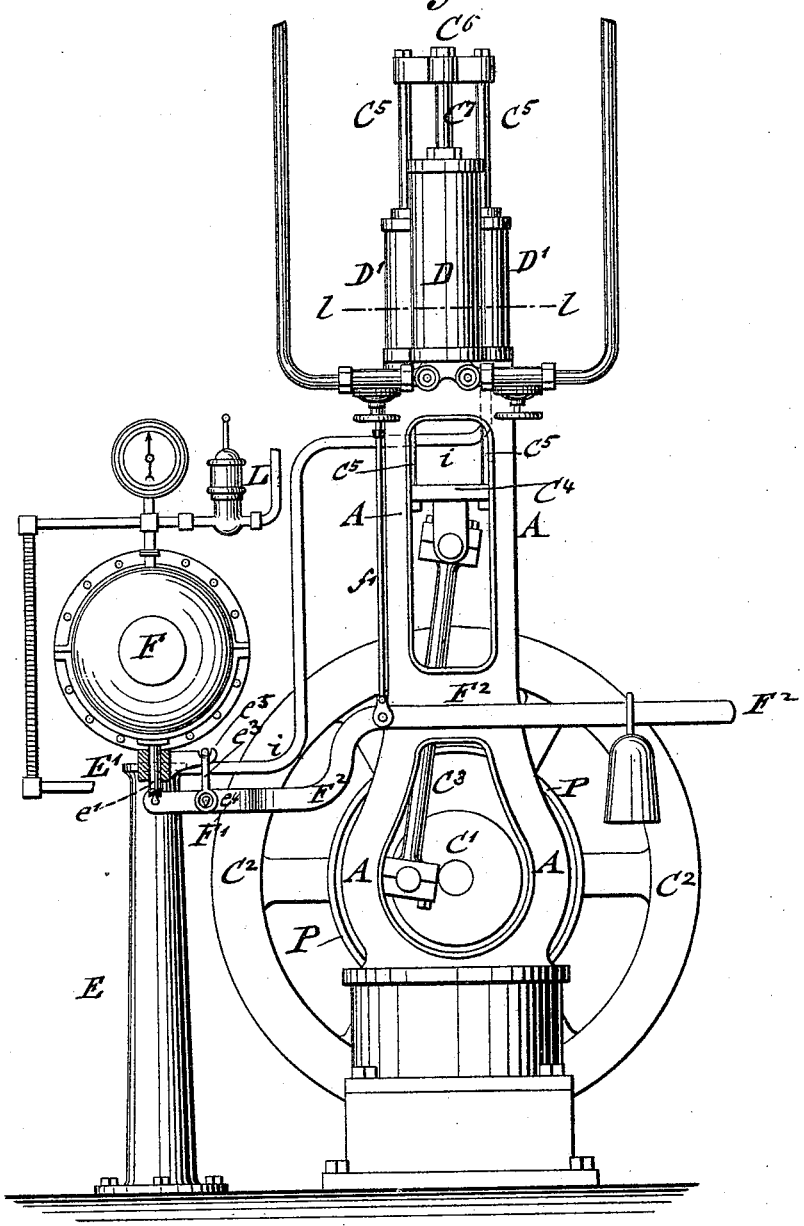
Figure 2:
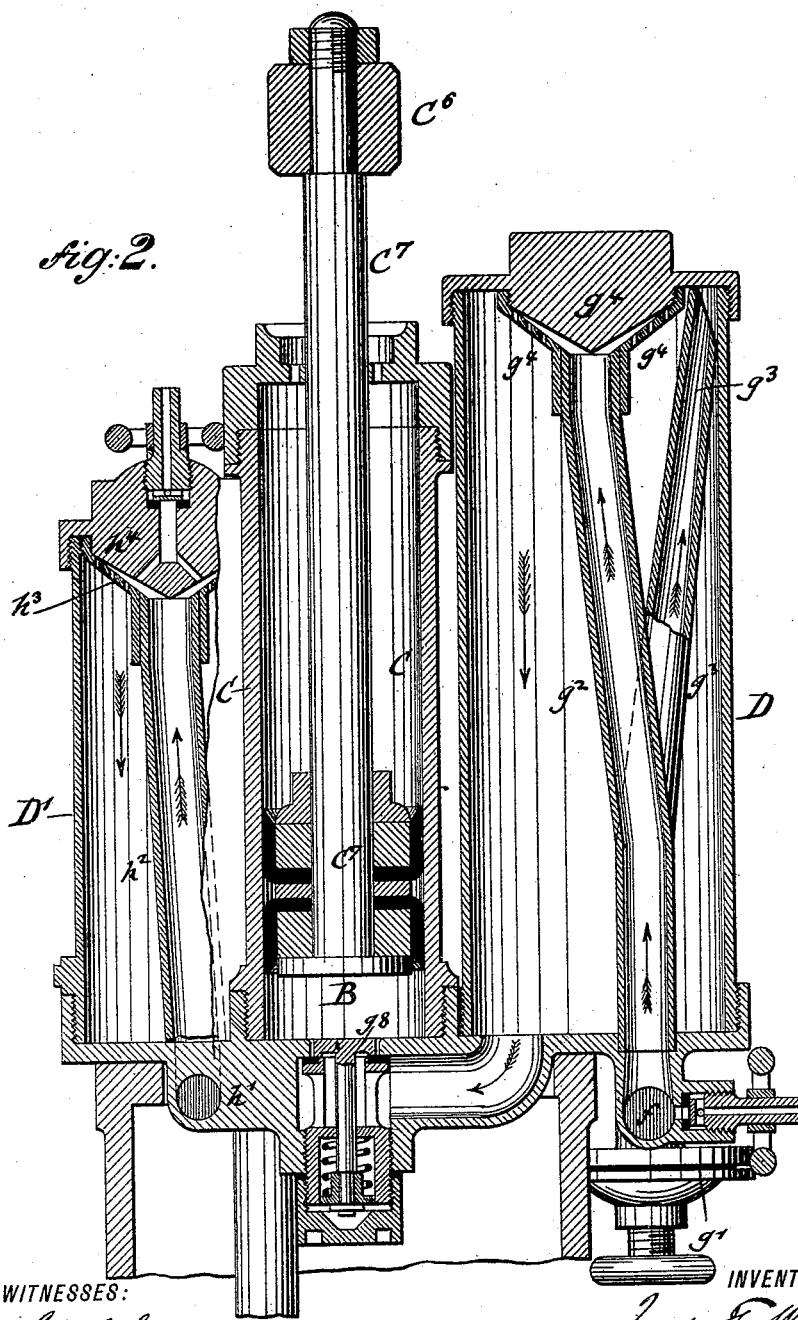
Figure 3:
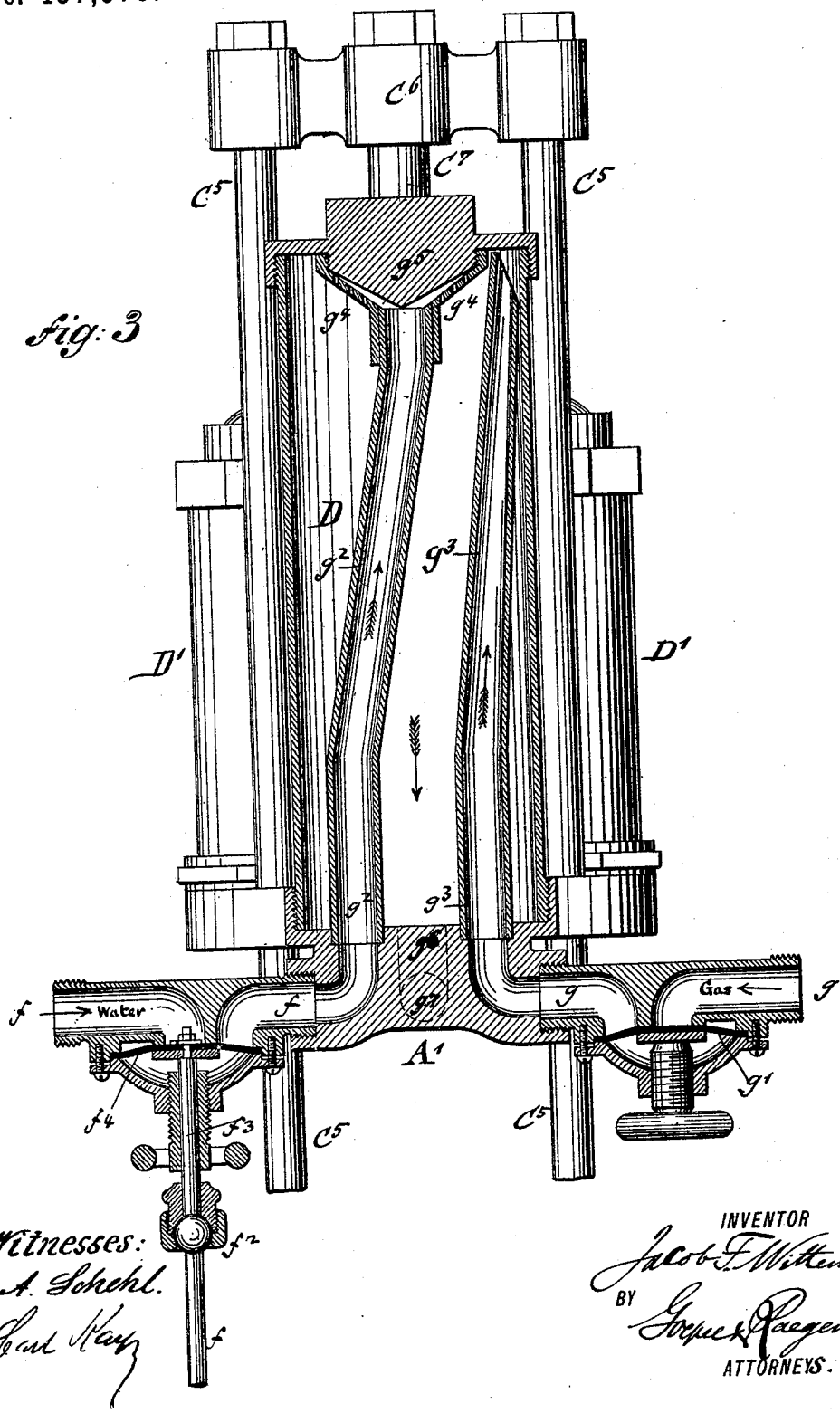
Figure 4:
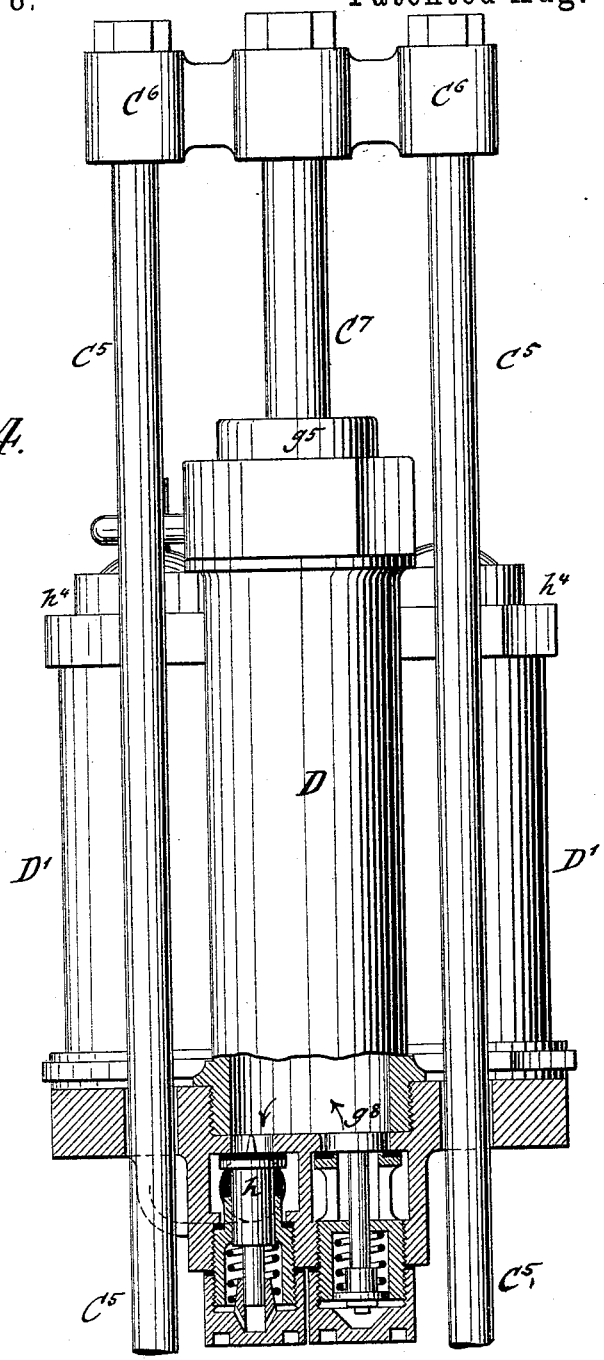

In the accompanying drawings, Figure 1 is a side elevation of my improved apparatus for making carbonated beverages. Fig. 2 is a vertical longitudinal section through the pump-cylinder and impregnating-vessels, taken on line $x$ $x$, Fig. 5, and drawn on a larger scale. Fig. 3 is a vertical transverse section on line $y$ $y$, Fig. 5. Fig. 4 is a front elevation of the pump-cylinder, partly in section, through the base of the same on line $z$ $z$, Fig. 5, so as to show the inlet and outlet valves. Fig. 5 is a horizontal section through the pump and impregnators, taken on line $l$ $l$, Fig. 1, and drawn on a larger scale. Fig. 6 is a vertical transverse section on line $k$ $k$, Fig. 5. Fig. 7 is a front elevation, one-half being in section, of the receiver with its pressure-relieving, pressure-reducing, and distributing valves. Fig. 8 is a plan of the fulcrumed balancing-lever of the receiver and its knife-edged supports; and Figs. $9^a$, $9^b$, and 10 are vertical sections, drawn on a still larger scale, respectively, of the distributing-valve, the pressure-reducing valve, and the relief-valve.

Similar letters of reference indicate corresponding parts.

Referring to the drawings, A A represent the upright supporting-standards of my improved carbonating-machine, which standards are connected at their upper ends by a suitable base-plate A', to which are attached the cylinder of a suction and force pump C, a primary mixing-vessel D, and the auxiliary impregnating-vessels D' D', as shown clearly in the sectional plan in Fig. 5.

The driving crank-shaft C' and fly-wheel $C^2$ of the machine are supported in bearings at the lower open parts of the standards A, the crank-shaft being connected by a connecting-rod $C^3$ with a cross-head $C^4$, which is guided in ways of the standards A. The cross-head $C^4$ is connected by two guide-rods $C^5$, which pass through the base-plate A' of the cylinders, with a cross-head $C^6$ and the upper end of the piston-rod $C^7$ of the suction and force pump C, said piston-rod passing through the head of the pump-cylinder and being connected to the piston B in the same, as shown clearly in Fig. 2. To the driving-shaft C' is applied a pulley P, to which motion is transmitted by a belt in the usual manner.

In front of the supporting-standards A is arranged a pillar E, which is provided at its upper end with an enlarged plate E', having guide-openings $e$ for the fixed guide-rods $e'$, attached to the bottom of a receiver F. The guide-rods $e'$ of the receiver F are recessed at their lower ends and supported on knife-edges $e^2$ at the forked front part F' of a fulcrumed and weighted lever $F^2$. The lever $F^2$ is hung by knife-edged pivots $e^4$ to links $e^3$, that are suspended from rearwardly-extending bracket-arms $e^5$ of the head E', as shown clearly in Figs. 1, 7, and 8. To the rear part of the weighted balancing-lever F' $F^2$ is pivoted a connecting-rod $f'$, which is coupled at its upper end by a ball-and-socket joint $f^2$ with a spindle $f^3$ of a diaphragm or other suitable valve $f^4$, by which the supply of liquid from the liquid-reservoir to the primary mixing-vessel D is automatically regulated, according to the increased or decreased quantity of carbonated liquid in the receiver. When the receiver is filled, the weight of the same lowers the lever $F^2$ and closes the valve $f^4$, while, when the carbonated liquid in the receiver is gradually drawn off, the receiver is raised and the valve $f^4$ opened by the action of the connecting-rod $f'$. By the up-strokes of the piston of the pump C the water or other liquid is drawn through the supply-pipe F into the primary mixing-vessel D, into which the carbonic-acid gas is simultaneously drawn through the pipe $g$, which leads from the gas-holder or other source of carbonic-acid gas into the vessel D. The carbonic-acid gas is confined in the gas-holder at a comparatively low pressure, so as to be readily drawn in by the pump without interfering with the regular suction of the water. The gas-supply pipe $g$ is provided with a diaphragm or other valve $g'$, which is adjusted by a hand-wheel, so as to supply the required quantity of gas to the apparatus. The liquid and gas are drawn into the upper part of the primary vessel D by means of pipes $g^2$ $g^3$, of which the pipe $g^2$ is connected at the upper end with a conical spray-head $g^4$, which is provided with jet-holes and screwed onto a conical diaphragm $g^5$ on the head of the vessel D. The diaphragm $g^5$ projects into the flaring spray-head of the water-supply pipe $g^2$, as shown clearly in Fig. 3. The upper end of the gas-supply pipe $g^3$ is cut off obliquely in such a manner that the water discharged through the jet-holes of the spray-head $g^4$ cannot enter into the gas-supply pipe and interfere with the free discharge of gas into the primary vessel D. The water is drawn up by the action of the pump from the supply-pipe $f$ into the pipe $g^2$ and forced against the conical diaphragm $g^5$ and into the tapering space between the conical diaphragm $g^5$ and the flaring spray-head $g^4$, so as to be forced in a fine spray through the jet-holes of the same. As the sprayed liquid drops through the primary vessel D, which is filled with gas, it is mixed with the same, so as to carry a certain quantity of gas along and produce thereby a preliminary mixing of the liquid with the gas. The impregnated water which collects at the lower part of the primary vessel D is then drawn by the up-stroke of the pump through a bottom opening $g^6$, connecting channel $g^7$ and the suction-valve $g^8$, into the pump-cylinder, from which it is forced by the downstroke of the piston, through the discharge-valve $h$ of the pump-cylinder, a connecting-channel $h'$, and a supply-pipe $h^2$, into the first impregnating-vessel D'. The water and gas drawn up in the pipe $h^2$ impinge against a fixed conical diaphragm $h^4$ and are squeezed through the tapering space between the diaphragm $h^4$ and a perforated spray-head $h^3$ at the upper end of the supply-pipe $h^2$ and then discharged through the jet-holes of the spray-head $h^3$ into the impregnating-vessel. The diaphragm $h^4$ and the spray-head $h^3$ of the other impregnating-vessels D' are constructed in the same manner as the corresponding parts in the primary vessel D and produce the breaking up of the liquid and the effective mixing of the gas. Relief-valve $h^x$ is arranged at the upper part of the impregnator D' and serves to permit the escape of the gas when the machine is to be stopped for cleaning. From the first impregnating-vessel D the gas-and-water mixture is conducted through a bottom opening $h^5$ in the bottom of the vessel D and channel $h^6$ to the supply-pipe $h^7$ of the second impregnating-vessel D, into which it is discharged by means of a flaring spray-head $h^3$ and conical diaphragm $h^4$ in the same manner as in the first impregnator, so that the still more intimate intermixing of the gas and water takes place. The carbonated liquid is then conveyed from the second impregnator D' by a pipe $i$ to the receiver F, said pipe being provided with a check-valve $i'$, as shown in Fig. 7.

By forcing the liquid in a spray through the perforated spray-heads of the impregnating-vessels D' and squeezing the liquid with the gas through the annular tapering spaces between the diaphragms and spray-heads the intimate and effective mixing or impregnating of the liquid with the gas is produced. If necessary, three or more impregnators may be used, and thereby the spraying and mixing operation repeated. By the effective mixing of the liquid and gas the impregnation of the liquid with the gas is more perfect, so that the gas is retained with considerable tenacity by the liquid and not liable of being given off when the liquid is dispensed. By the effective mixing device of the impregnating-vessels the impregnation of the liquid by the gas is produced without the use of movable agitators in a more perfect manner, while by the convenient disposition of the impregnating-vessels close to and around the pump they can be supported at the upper part of the supporting-standards, whereby the floor-space taken up by the apparatus is considerably diminished. Another advantage of the impregnating device is that a smaller number of joints is required in the machine, by which not only loss of gas by leakage is avoided, but also a more reliable functioning of the apparatus obtained. The carbonated liquid could now be drawn off from the receiver; but in order to allow for variations between the supply and demand the receiver operates automatically by the varying quantity of liquid in the same and the action of the fulcrumed and weighted balancing-lever and the connecting-rod on the liquid-supply valve, whereby the supply of liquid into the primary vessel is regulated and at times interrupted when the receiver is nearly or entirely filled. In this case the pump sucks only gas which is drawn through the primary mixing-vessel into the pump and forced by the latter through the impregnating-vessels and into the receiver. Any excess of gas in the receiver is automatically discharged from the same by means of a relief-valve L, (shown in Figs. 1, 7, and 10,) said relief-valve being adjusted to any desired degree of pressure under which the carbonated liquid in the receiver is to be kept.

The relief-valve L has the same area as the discharge-valve of the pump for the purpose of avoiding any temporary increase of pressure in the receiver, which would be the case if the area of the discharge-valve of the pump would be larger than the area of the relief-valve. The pressure in the receiver is thereby kept uniform and the continuous pumping and blowing off of gas permitted, even when the liquid supply is interrupted. In this manner only can the automatic working of the machine be kept up without affecting the pressure-gage.

Above the receiver F is arranged a distributing-chamber L', which is connected by a curved downwardly-extending pipe $L^2$ to the bottom of the receiver F, and by a number of distributing-pipes $l$ with the bottling-machines. The connecting-pipe $L^2$ terminates in the distributing-chamber L' and is provided with a valve $L^x$, the shank of which is guided in a stuffing-box of the distributing-chamber L', said valve being removed from or applied to the connecting-pipe $L^2$ whenever the carbonated liquid is to be drawn off or the discharge of the same interrupted. The distributing-chamber L' serves for facilitating the drawing off of the carbonated liquid, as the liquid is rested in the same before being supplied to the distributing-nozzles. The relief-valve also serves for discharging the atmospheric air contained in the liquid. As the same is lighter than the carbonic-acid gas, it rises to the top of the receiver and is discharged as soon as the pressure of the gas in the receiver overcomes the pressure at which the blow-off valve is set. By arranging a pressure-reducing valve $L^3$ intermediately between the receiver F and the distributing-chamber L', as shown in Fig. 7 and in detail in Fig. 9$^a$, the carbonated liquid in the receiver can be kept at a higher pressure than the pressure required by the same for distributing purposes, by which higher pressure any fermentable germs or organisms that are carried along by the air contained in the water are killed, thereby rendering them innocuous. The pressure-reducing valve is located below the discharge-valve at the upper part of the discharge-pipe $L^2$ and serves for drawing off the carbonated liquid at the lower pressure required for bottling or dispensing purposes, while keeping up the higher pressure in the receiver.

The pressure-reducing valve $L^3$ is shown in Fig. 9$^a$ and is constructed of a guided valve that is forced down onto its seat by a spiral spring, the tension of which is adjusted by a suitable screw-spindle, so as to regulate the degree of pressure at which the valve discharges the liquid. In place of the regulating-valve shown any other approved construction may be used, as the same forms no part of my invention.

I am aware that carbonating-machines in which the liquid is impregnated with gas by means of impregnators through which the liquid and gas are forced by the action of a pump, so as to be intimately mixed, were used heretofore. I am also aware that the automatical working of the machine by an oscillating and balanced receiver which is connected with the valve of the water-supply pipe and operated by the same is well known, and I do not claim these features.

Having thus described my invention, I claim as new and desire to secure by Letters Patent—

1. The combination of a primary mixing-vessel provided with valved gas and liquid supply pipes, said pipes being extended to near the top of the vessel, a spray device at the upper end of the liquid-supply pipe, and a pump connected with the mixing-vessel for drawing the gas and liquid into the same, substantially as set forth.

2. In a carbonating-machine, a primary mixing-vessel provided with a gas-supply pipe extending to near the top of the vessel, a liquid-supply pipe having a flaring and perforated spray-head, and a fixed conical diaphragm above said spray-head, substantially as set forth.

3. In a carbonating-machine, an impregnating-vessel provided with a supply-pipe having a flaring perforated spray-head, and a fixed conical diaphragm projecting into said spray-head and forming a space of gradually-diminishing width between the spray-head and diaphragm, substantially as set forth.

In testimony that I claim the foregoing as my invention I have signed my name in presence of two subscribing witnesses.

JACOB F. WITTEMANN.

Witnesses:
PAUL GOEPEL,
JOHN A. STRALEY.